United States Patent [19]

Chou et al.

[11] Patent Number: 5,506,329
[45] Date of Patent: Apr. 9, 1996

[54] ALDIMINE OXAZOLIDINES AND THEIR USE WITH POLYISOCYANATE PREPARATIONS

[75] Inventors: Chih-Yueh Chou, Elk Grove; Marina D. Hoffman, Cary, both of Ill.

[73] Assignee: Angus Chemical Company, Buffalo Grove, Ill.

[21] Appl. No.: 321,436

[22] Filed: Oct. 11, 1994

Related U.S. Application Data

[63] Continuation-in-part of Ser. No. 143,470, Oct. 26, 1993, Pat. No. 5,466,769.
[51] Int. Cl.$^6$ .......................... C08F 283/04; C08G 18/10
[52] U.S. Cl. ........................ 528/60; 528/62; 528/68; 528/73; 525/123; 525/375; 525/381; 525/383; 525/453
[58] Field of Search .................. 528/68, 73, 60, 528/62; 525/123, 375, 381, 383, 453

[56] References Cited

U.S. PATENT DOCUMENTS

| | | | |
|---|---|---|---|
| 3,743,626 | 7/1973 | Emmons | 260/77.5 AQ |
| 4,046,744 | 9/1977 | Jenkins | 260/77.5 AQ |
| 4,054,717 | 10/1977 | Gill et al. | 428/452 |
| 4,192,786 | 3/1980 | Shibayama et al. | 260/18 |
| 4,504,647 | 3/1985 | Zabel et al. | 528/68 |
| 4,874,805 | 10/1989 | Mülhaupt et al. | 524/188 |
| 5,104,955 | 4/1992 | Mathai | 526/323.2 |
| 5,214,086 | 5/1993 | Mormile et al. | 524/237 |
| 5,223,174 | 6/1993 | Chou et al. | 252/194 |

FOREIGN PATENT DOCUMENTS 3019356  11/1981  Germany.

OTHER PUBLICATIONS

Primary Technical Data Sheet, "Zoldine RD-4 Aldimine Oxazolidine Reactive Diluent," PDS 15, Jan. 1993.

*Primary Examiner*—Robert E. Sellers
*Assistant Examiner*—Randy Gulakowski
*Attorney, Agent, or Firm*—Arnold, White & Durkee

[57] ABSTRACT

Methods of using a mixture as a corrosion inhibitor, moisture scavenger, formaldehyde scavenger, rheological modifier, thermoplastic foam inhibitor, antifreezing agent, decolorizing agent, drying agent and corrosion inhibitor are provided by the present invention. The mixture comprises an aldimine oxazolidine compound having the formula:

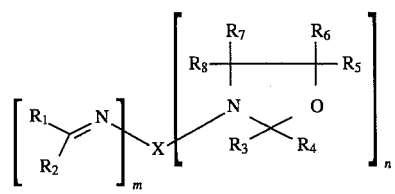

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

7 Claims, No Drawings

ALDIMINE OXAZOLIDINES AND THEIR USE WITH POLYISOCYANATE PREPARATIONS

This application is a continuation-in-part of patent application Ser. No. 08/143,470 filed Oct. 26, 1993, now U.S. Pat. No. 5,466,769.

FIELD OF THE INVENTION

The present invention is generally related to methods of using aldimime oxazolidine compounds. In particular, the present invention relates to methods of using the compounds as a corrosion inhibitor, moisture or formaldehyde scavenger, rheological modifier, thermoplastic foam inhibitor, antifreezing agent, and dispersion stabilizer.

BACKGROUND OF THE ART

Moisture curable polyurethane coatings are extensively used as commercial and industrial protective and/or decorative coatings. Polyurethane coatings, known in the industry as one of the toughest coatings available, are routinely applied as protective coatings on exterior walls of buildings, industrial machinery, military equipment and vehicles, commercial and passenger vehicles, and any other surface requiring a protective coating. Moisture curable polyurethane systems are also used extensively as sealants and adhesives.

Moisture curing polyurethane coating systems typically include a polyisocyanate or prepolymer component which reacts with atmospheric water at room temperature to form useful films. These systems also include pigments, organic solvents, and a variety of adjuvant components, e.g., surface active agents, dispersants, diluents, and fillers. Since the polyisocyanate component reacts with even trace amounts of moisture, extreme care must be taken so that the polyisocyanates do not contact water until they are applied to a surface to be coated. Water is, however, unintentionally and unavoidably introduced into the formulation process in the form of dissolved water in solvents, adsorbed and absorbed moisture on the surfaces of fillers and pigments, and atmospheric moisture. Subsequent reaction of the water with the polyisocyanate component of the system results in an irreversible reaction which will harden the product, making it unusable before it can be applied to the surface to be coated. This water must be removed in order to produce an acceptable product. The existing methods for preparing color-pigmented moisture curable polyurethane coatings require expensive equipment to dry the pigments, solvents, and fillers. In the alternative, moisture scavenging agents are added to the coating preparation or are added to the pigments, solvents and other raw materials prior to or during preparation of the coating.

One group of moisture scavenging compounds are the molecular sieves. Molecular sieves adsorb water into their pores, thereby binding the water and preventing it from reacting with the polyisocyanate component. An example of a molecular sieve is sodium potassium aluminosilicate, available from the Mobay Corp., Pittsburgh, Pa., under the tradename designation Baylith L Powder. One disadvantage of using molecular sieves is that they reduce the gloss of the cured coating. Another disadvantage of molecular sieves is that they will sometimes plasticize or embrittle the cured coating.

A second group of water scavenging agents widely used to prevent moisture contamination of moisture curable polyurethane coating systems is the monomeric isocyanates. A typical monomeric isocyanate, such as p-toluenesulfonyl isocyanate (Vanchem, Inc. Lockport, Conn.), reacts with water to generate carbon dioxide and the corresponding sulfonamide, e.g., p-toluenesulfonamide. The carbon dioxide diffuses from the pigment grind during the dehydration phase as carbon dioxide gas. A disadvantage of monomeric isocyanates is that they are harmful if swallowed, inhaled, or absorbed through the skin and are extremely corrosive to the tissues of the mucous membranes, upper respiratory tract, and skin.

There is a need for a moisture scavenger which efficiently, cost effectively, and safely removes water from moisture curable coating systems and from any other preparation where residual water is a problem, without seriously detracting from the performance of the cured coating.

Formaldehyde is a raw material frequently used in polymeric systems including phenol-formaldehyde, urea-formaldehyde, and melamine-formaldehyde. Exposure to formaldehyde vapors in the workplace is stringently controlled by the use of formaldehyde scavengers. Formaldehyde scavengers capture formaldehyde and hold it in a form having significantly lower formaldehyde vapor pressure. Products such as textiles and plywood typically contain a formaldehyde scavenger to reduce free formaldehyde levels without changing the physical properties of the products. Known formaldehyde scavengers include nitroparaffins such as nitromethane (NM™), nitroethane (NE™), 1-nitropropane (NiPar S-10™) and 2-nitropropane (NiPar S-20™), and amino alcohols such as 2-amino-2-methyl-1-propanol (AMP™), 2-amino-2-ethyl-1,3-propanediol (AEPD®) and tris(hydroxymethyl)aminomethane (TRIS AMINO®), which are manufactured by ANGUS Chemical Company.

There is a need for a formaldehyde scavenger which efficiently, cost effectively, and safely removes formaldehyde from polymeric systems and from any other preparation where free formaldehyde is a problem, without seriously detracting from the performance or physical properties of the system.

Corrosion is often prevalent in engine cooling systems. Metals such as copper, iron, steel, aluminum, magnesium and the like are often exposed to high temperatures, pressures and flow rates in these cooling systems. These conditions corrode metal forming corrosion products which may cause engine overheating or engine failure. Lightweight metals in engine components such as aluminum and magnesium are subject to pitting of radiator tubes, crevice corrosion at hose connections, and deposit corrosion from deposition of corrosion products. Corrosion inhibitors are added to antifreeze/coolant compositions and functional fluids which contact metal to prevent and control corrosion in engine cooling systems and other machinery. U.S. Pat. No. 4,282,108 describes oxazolidine derivatives which are used as chelants, anti-copper-corrosion additives and frictional modifiers in automatic transmission fluid, and oxidation inhibitors in middle distillate fuels.

There is a need for a corrosion inhibitor which effectively reduces the incidence of corrosion of metals or alloys, and which may be applied to a surface of a metal or alloy or may be incorporated in a functional fluid which contacts a surface of a metal or alloy.

Coating, adhesive or sealant formulations also may include rheological modifiers to reduce viscosity, disperse pigments, and improve solvency, flow and leveling. Formulations which do not contain rheological modifiers may exhibit a rapid increase in viscosity for a relatively small increase in solids content. The increased viscosity causes the formulation to set quickly resulting in striations in the formulation. Addition of a rheological modifier enables the formulation to flow into a smooth layer before it sets. Conventional rheological modifiers include polyethylene glycols such as Carbowax and polyethylene oxides such as Polyox.

There is a need for a rheological modifier to reduce viscosity, reduce volatile organic content, disperse pigments, and improve the solvency, flow and leveling properties of a coating, adhesive or sealant.

SUMMARY OF THE INVENTION

The present invention provides a method of scavenging moisture from a preparation by admixing with the preparation an effective amount of an aldimine oxazolidine compound having the structure:

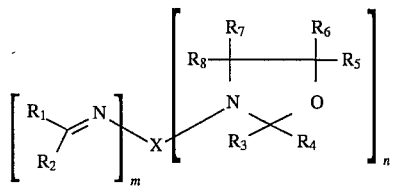

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

In a preferred embodiment, the effective amount of the moisture scavenging compound includes from 1 to 100 moles of the aldimine oxazolidine compound for every mole of water in the preparation. The preparation is preferrably a composite, sacrificial pigment, gas ink, industrial fluid, coating, ahesive, sealant, or coating component.

A second aspect of the present invention is a method of scavenging formaldehyde from a a preparation containing formaldehyde. An effective amount of an aldimine oxazolidine compound is admixed with the preparation. In a preferred embodiment, the effective amount of the mixture includes from 1 to about 100 moles of the compound for every mole of formaldehyde in the preparation.

Another aspect of the present invention is a method of inhibiting corrosion of a metal or alloy. An effective amount of the aldimine oxazoldine compound described above intimatley contacts the metal or alloy. In a preferred embodiment, the metal or alloy is coated with the compound. Alternatively, the compound is admixed with an industrial fluid. Preferably, from 1 to about 100 moles of the compound is added for every mole of water in the industrial fluid.

A preferred embodiment of the present invention is the method of inhibiting corrosion in a refrigerant system, where the refrigerant is admixed with the refrigerant. Preferrably, an effective amount of the aldimine oxaoldine compound is from about 1 to 100 moles for every mole of water to be removed from the refrigerant.

Still another aspect of the present invention is a method of modifying the rheology of a preparation. An effective amount of the compound is admixed with the preparation. Preferably, from 1 to 50 wt. % of the compound is added based on the total weight of the preparation.

A further aspect of the invention is a method of reducing foaming of a thermoplastic. An effective amount of the compound is admixed with the thermoplastic. Preferably, from I to 100 moles of the compound is added for every mole of water in the thermoplastic.

Another aspect of the invention is directed to a method for preventing the formation of ice crystals and for depressing the freezing point of a preparation. According to the method, an effective amount of the compound described above is intimately admixed with the preparation. The preparation is preferably an industrial fluid. In a preferred embodiment, the moisture scavenging compound is an aldimine oxazolidine compound and the effective amount of the compound includes from 1 to 100 moles of the compound for every mole of water in the preparation. If the preparation does not contain water, the effective amount of the mixture is from 1 to about 50 wt. % of the mixture based on the total weight of the preparation.

In another aspect, the present invention provides a method of obtaining a stable dispersion, suspension or solution. An effective amount of the aldimine oxazolidine compound is admixed with the dispersion, suspension or solution. Preferably, from 1 to about 50 wt. % of the compound is added based on the total weight of the dispersion, suspension or solution.

DETAILED DESCRIPTION OF THE INVENTION

The present invention provides an aldimine oxazolidine compound which can be advantageously used in the formulation of preparations including sealants, adhesives and coatings. For the purposes of the present invention, a coating is any polyurethane coating, including both one and two component coatings. These coatings are typically cured by moisture, ambient, thermal, forced dry, radiation or bake curing. The compound acts as a theological modifier, drying agent, dispersant, reactive diluent and bubble formation inhibitor in these systems. Additionally, the compound is a reactive diluent in inks, a drying agent in inks, composites, sacrificial pigments, radiation cure coatings and industrial gasses, an antifreezing agent in functional fluids, and a formaldehyde scavenger in preparations such as polymeric systems, textiles and plywood.

It has been discovered that a class of compounds including kerimine and aldimine alcohols, substituted monocyclic oxazolidines and aldimine oxazolidine are excellent formaldehyde scavengers, drying agents, reactive diluents, antifreezing agents, dispersants, theological modifiers, and bubble formation inhibitors. The prior art has disclosed a rather broad class of oxazolidine compounds as crosslinking reagents, reacting with polyfunctional isocyanates in the presence of polyols or water to form polymeric coatings. U.S. Pat. No. 4,101,527 discloses an equimolar reaction of an oxazolidine with a polyfunctional isocyanate in the presence of water to form a polyurethane coating. U.S. Pat.

No. 3,941,753 describes pre-polymers for coating formation prepared from the reaction of a ketiminoalkanol with a polyisocyanate.

The aldimine oxazolidines of the present invention have the formula:

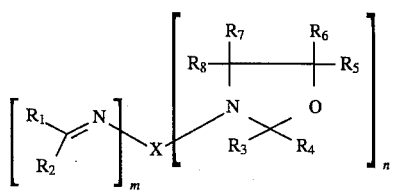

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

Referring to the aldimine oxazolidine compounds of the present invention, the preferred R group substituents are those which increase the reactivity of the ring to water. In one preferred embodiment of the invention, the R substiuent.

In a specific embodiment of the invention, α,α-4,4-tetramethyl-2-(methylethyl)-N-( 2-methylpropylidene)-3-oxazolidine ethanamine (RD-4) is prepared by reacting 2-[( 2-amino-2-methylpropyl)-amino]-2-methyl-1-propanol with isobutyraldehyde.

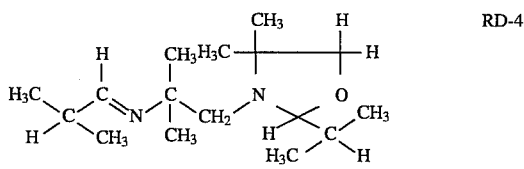

The moisture scavenging aldimine oxazolidine compounds of the present invention react chemically with water. One mole of moisture scavenging aldimine oxazolidine compound will react with and remove one mole of water. Therefore, it is preferred that the moisture scavenging mixtures of the invention containing aldimine oxazolidine compounds include at least one mole of the moisture scavenging aldimine oxazolidine compound for each mole of water to be removed from a preparation. However, since a perfectly efficient reaction environment cannot be guaranteed in industrial settings, it is preferable that from 1 to about 10 moles of the moisture scavenging aldimine oxazolidine compound be included for every mole of water to be removed from a preparation. Some applications require that only from 1 to about 3 moles of the moisture scavenging aldimine oxazolidine be included for every mole of water to be removed from the preparation. Greater amounts of the aldimine oxazolidine compound can be added to reduce the viscosity and/or volatile organic content of the preparation. As much as 100 moles of the mixture may be required to effect the desired change in the physical properties of the preparation.

In one aspect, the present invention is directed to a method scavenging moisture from a preparation. The method comprises admixing with the preparation from about 1 to about 100 moles of a moisture scavenging aldimine oxazolidine as described above. Preferred preparations include a composite, sacrificial pigment, gas, ink, industrial fluid, coating, adhesive, sealant and coating component. According to the method, an effective amount of the mixture of the present invention including an aldimine oxazolidine moisture scavenging compound as described above is intimately admixed with the preparation. In a preferred embodiment, the effective amount includes from 1 to about 10 moles of the compound for every mole of water in the preparation to be dehydrated. Most preferably, from 1 to about 3 moles of the compound is added to the preparation for every mole of water in the preparation to be dehydrated.

According to one embodiment of the invention, catalysts are added in combination with the aldimine oxazolidine compound of the present invention to facilitate the reaction with water. The addition of a preferred catalyst will, in some instances, minimize the amount of the aldimine oxazolidine compound required to remove water from a preparation by increasing the efficiency of the reaction. Furthermore, a preferred catalyst will, in certain circumstances, increase the rate at which the moisture scavenging compounds react with water. Preferred catalysts include the organometallic catalysts, such as dibutyltin dilaurate, the mineral acid catalysts and the organic acid catalysts, such as acetic acid.

According to another embodiment of the invention, the reaction between the moisture scavenging compounds and water occurs at temperatures from ambient to about the boiling point of the preparation being dehydrated. Preferably, this range is from about 40 to about 180 degrees Fahrenheit. Increasing the temperature at which the reaction occurs increases the rate and the efficiency of the reaction.

The moisture scavenging compounds of the present invention are advantageously used in preparations including polyurethane coatings, sealant and adhesive systems to remove moisture during the formulation, packaging and application steps. The present invention provides the producer of preparations with an expedient and efficient alternative to the physical methods of dehydration, exemplified by molecular sieves and drying machinery, and the potentially toxic prior chemical methods, exemplified by the monomeric isocyanates presently available. The compounds also provide the coatings with improved consistency and application properties by improving the solvency effects (i.e., the degree to which a solvent holds a resin or other paint binder in solution) in the urethane coatings. The moisture scavenging compounds of the present invention are further provided for the storage stabilization of moisture curable polyurethane systems. A still further intended use of the invention is the dehydration of surfaces onto which moisture curable coatings are to be applied.

The compounds of the present invention are also useful in scavenging moisture from radiation cure coatings such as UV cure coatings. The addition of the moisture scavenging mixture to a radiation cure coating reduces hazing, cloudiness and brittleness that is caused by the presence of moisture.

Composites and gasses are also dried using the compounds of the present invention. Composites are elastomers which are considerably thicker than films, such as sealants, construction materials, shoe soles, extruded plastics, and aerospace panels. Composites, like urethane coatings, may be adversely affected by water prior to curing. The moisture scavenging compounds are added to a composite prior to curing to reduce brittleness of the elastomer which results from moisture. Gasses are dehumidified for use in industrial processes through the use of the moisture scavenging compounds. For example, forced air flow over a urethane coating serves to dehumidify the air.

The moisture scavenging compounds are also useful in drying inks. During the process of forming an ink, a pigment slurry is commonly mixed with resins or vehicles to drive water out of the slurry. After this flushing stage, any residual water is removed by subjecting the ink to a two to six hour vacuum stripping process. The compounds of the present invention are added to the slurry either alone or with a resin to scavenge the water from the ink after flushing of the ink so that the conventional vacuum stripping process can be eliminated or minimized.

The invention provides an anhydrous composition including the moisture scavenging compounds described above and an organic solvent. Solvents used in the formulation of one and two-component systems are rapidly dehydrated by treating them with the moisture scavenging mixture of the invention. This anhydrous composition is useful in any application where water is preferably avoided, e.g., preparing moisture curable polyurethane coatings, or dehydrating surfaces prior to applying moisture curable coatings. The quantity of moisture scavenger in the composition will vary with the water content of the solvent. The amount of water in the organic solvent being dehydrated can be determined by gas chromatography or Karl Fischer technique. The solvents generally used in the formulation of specialty polyurethane systems are compatible with the moisture scavenging compositions of the present invention. Solvents generally used in the preparation of polyurethane moisture scavenging preparations include aprotic solvents, such as ketones, esters, ethers, nitroparaffins, glycol esters, glycol ether esters, halogenated hydrocarbons, and alkyl and aromatic hydrocarbons.

Pigments, fillers, polyisocyanates, and adjuvants are suspended in organic solvents. For the purposes of this invention the term "fillers" is intended to include those materials added to a coating preparation to increase the solids content of the coating. The term "adjuvants" is intended to include those materials which are added to the coating formulation to aid application or formation, such as surface active agents, anti-settling agents, diluents, suspending agents, dispersants, flow additives, UV inhibitors and the like. Pigments, fillers, polyisocyanates and adjuvants can also be dehydrated with the water scavenging compositions of the present invention. Sacrificial pigments, for example, are added to coatings so that the pigment will corrode for the sake of protecting an underlying metal substrate from corrosion. Conventional sacrificial pigments include chromium oxide, zinc oxide, and strontium oxide. The addition of the moisture scavenging compounds of the present invention to the sacrificial pigment prevent corrosion of the pigment prior to its use in a coating formulation.

One aspect of the present invention is a substantially anhydrous composition including pigments, fillers, organic solvents, and the moisture scavenging compounds described above. It has been determined that a reaction period of from 30 minutes to about twenty-four hours is preferred to ensure substantially complete dehydration of pigment preparations. The amount of the moisture scavenger composition required to dehydrate the pigment or filler will vary with the total water content. Through the addition of the moisture scavenging composition of the invention, an anhydrous composition is produced including pigments, organic solvents, fillers, polyisocyanates and adjuvants. Alternatively, any of the above-listed components can be deleted, depending on the needs of the ultimate user. This anhydrous composition is useful in applications where water is preferably avoided, e.g., in the formulation of moisture curable polyurethane coatings.

Another aspect of the present invention is directed to a method of scavenging formaldehyde from a preparation, where the method comprises admixing with the preparation from 1 to about 100 moles of a moisture scavenging compound for every mole of water to be dehydated from the preparation, the moisture scavenging compound having the structure:

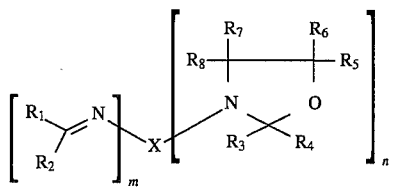

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

The preferred R group substituents of the aldimine oxazolidine compounds of the present invention are also those which increase the reactivity of the compound to formaldehyde. The formaldehyde scavenging aldimine oxazolidine compounds of the present invention can react with formaldehyde and upon hydrolysis, will react with formaldehyde to form an oxazolidine reaction product. One mole of formaldehyde scavenging aldimine oxazolidine will react with and remove one mole of formaldehyde. Therefore, it is preferred that the formaldehyde scavenging mixtures of the invention containing aldimine oxazolidine include at least one mole of the formaldehyde scavenging aldimine oxazolidine for each mole of formaldehyde to be removed from a preparation. However, since a perfectly efficient reaction environment cannot be guaranteed in industrial settings, it is preferable that from 1 to about 10 moles of the formaldehyde scavenging aldimine oxazolidine alcohol be included for every mole of formaldehyde to be removed from a preparation. Some applications require that only from 1 to about 3 moles of the formaldehyde scavenging aldimine oxazolidine be included for every mole of formaldehyde to be removed from the preparation.

In one embodiment, the preparation is a phenol-formaldehyde, urea-formaldehyde, or melamine-formaldehyde polymeric system. According to the method, an effective amount of the compound of the present invention including an aldimine oxazolidine formaldehyde scavenging compound as described above is intimately admixed with the preparation. An effective amount is an amount of the mixture which removes free formaldehyde in the preparation. In a preferred embodiment, the effective amount includes from 1 to about 10 moles of the mixture for every mole of formaldehyde in the preparation. Most preferably, from 1 to about 3 moles of the mixture is added to the preparation for every mole of formaldehyde in the preparation. The compounds of the present invention will scavenge formaldehyde regardless of the presence of water in the preparation. However, the presence of a catalyst or water may facilitate the reaction of the aldimine oxazolidine compound with formaldehyde.

Another aspect of the present invention is directed to a method of inhibiting corrosion of a metal or alloy. According to the method, an effective amount of the compound of the present invention including an aldimine oxazolidine corrosion inhibiting compound as described above contacts the surface of a metal or alloy. An effective amount is an amount of the mixture sufficient to prevent the formation of corrosion in a preparation. In one embodiment, the mixture is applied directly to the metal or alloy by coating the metal or alloy with the mixture. Alternatively, the mixture may be incorporated into a paint formulation or other coating formulation which is to be applied to the metal or alloy. In a second embodiment, the mixture is intimately admixed with a functional fluid which contacts a metal or alloy. The term "functional fluid" is defined for purposes of the present invention to include any industrial fluid such as a lubricant, hydraulic fluid, hydrocarbon fuel, jet fuel or refrigerant. Additional examples of functional fluids include but are not limited to transmission fluid, motor oil, gasoline, diesel fuel, kerosene, greases, and synthetic oils such as polyethylene oils, polysilicones, fluorohydrocarbon oils, and esters of dicarboxylic acids, polyglycol and alcohol. The functional fluid may also be an aqueous system such as a cooling water system, an air conditioning system, a refrigeration system or a steam generating system. In a preferred embodiment, the effective amount includes from 1 to about 10 moles of the mixture for every mole of water in the functional fluid. Most preferably, from 1 to about 3 moles of the mixture is added to the preparation for every mole of water in the functional fluid.

A preferred embodiment of the present invention provides a method of inhibiting corrosion in a refrigeration system comprising admixing an effective amount of a moisture scavenging aldimine oxazolidine with the refrigerant of a refrigeration system.

Refrigerants cool by successive cycles of vaporization and condensation. As a refrigerant undergoes successive cycles of vaporization and condensation, moisture enters the refrigeration system where it corrodes the components of the refrigergation system. Commonly used refrigerants include fluorocarbons and other halogenated hydrocarbons. In a refrigeration system, the amount of moisture that enters cannot be reliably predicted. An aldimine oxazolidine compound as disclosed by the present invention reacts with the moisture that enters the refrigeration system and protects the refrigeration system from corrosion. Preferably, the effective amount of a moisture scavenging aldimine oxazolidine is from about 1 to about 100 moles for every mole of water to be removed from the refrigerant. An aldimine oxazolidine compound as disclosed herein inhibits corrosion by scavenging moisture that enters the refrigeration system.

A further aspect of the invention is directed to a method of modifying the rheology of a preparation. Rheology is the deformation and flow properties of the preparation. Rheological properties which may be modified by the compound of the present invention include sagging, flow, levelling and film build. In an embodiment of the method, the preparation is a coating, adhesive or sealant which has improved flow and levelling. According to the method, an effective amount of the compound of the present invention including an aldimine oxazolidine compound as described above is intimately admixed with the preparation. An effective amount is an amount of the mixture which is sufficient to reduce the viscosity and/or improve the rheological properties of the preparation. In a preferred embodiment, the effective amount includes from 1 to about 30 weight percent of the mixture based on the total weight of the preparation. Most preferably, from 1 to about 10 weight percent of the mixture based on the total weight of the preparation is added. Although the compound can be added to the preparation at any stage, it is most common to add the mixture during the grind phase and/or the let down phase. When the mixture is added during the grind phase, the mixture also acts as a pigment dispersant to prevent agglomerate formation. Accordingly, addition of the compound to a coating, adhesive or sealant assures that the pigment particles are finely divided and stabilized.

Another aspect of the invention is directed to a method of reducing the foaming of a thermoplastic to improve processing and quality of the thermoplastic. Foaming during formation of urethane and urethane/polyurea thermoplastics is produced by the formation of carbon dioxide from the reaction of water with an isocyanate. According to the method, an effective amount of the compound of the present invention including an aldimine oxazolidine foam inhibiting compound as described above is intimately admixed with the thermoplastic. An effective amount is an amount of the compound which will react with water in the thermoplastic to prevent the formation of carbon dioxide. In a preferred embodiment, the effective amount includes from 1 to about 10 moles of the compound for every mole of water in the thermoplastic. Most preferably, from 1 to about 3 moles of the compound is added to the thermoplastic for every mole of water in the thermoplastic.

Yet another aspect of the present invention is directed to a method for preventing the formation of ice crystals and for lowering the freezing point of an industrial fluid while removing moisture from the preparation. Conversely, conventional antifreezing agents lower the freezing point of an industrial fluid without removing moisture from the fluid. According to the method of the invention, an effective amount of the mixture of the present invention including an aldimine oxazolidine compound as described above is intimately admixed with an industrial fluid which may be exposed to low temperatures during use in automobiles, airplanes or other machinery. An effective amount is an amount of the compound which prevents an industrial fluid from freezing. The term "industrial fluid" is defined for the purposes of this invention to include any lubricant, hydraulic fluid, hydrocarbon fuel, jet fuel and the like. In a preferred embodiment, the effective amount includes from 1 to about 10 moles of the compound for every mole of water in the industrial fluid. Most preferably, from 1 to about 3 moles of the compound is added to the preparation for every mole of water in the industrial fluid. If the preparation does not contain water, the effective amount of the mixture is from 1 to about 30 wt. % of the compound based on the total weight of the preparation. Most preferably, from 1 to about 10 wt. % of the compound based on the total weight of the preparation is added to the preparation.

Another aspect of the present invention is directed to a method of obtaining a stable dispersion, suspension or solution. According to the method, an effective amount of the compound of the present invention including an aldimine oxazolidine stabilizing compound as described above is intimately admixed with the dispersion, suspension or solution. An effective amount is an amount of the compound which provides sufficient solvency or pigment dispersability. Solvency is the ability of an additive to hold a resin or other binder in solution. Dispersability is the ability of an additive to increase the stability of a suspension of pigments in a liquid medium. In a preferred embodiment, the effective amount includes from 1 to about 30 weight percent of the compound based on the total weight of the dispersion, suspension or solution. Most preferably, from 1 to about 10 weight percent of the compound based on the total weight of the dispersion, suspension or solution is added.

The following examples are presented to describe preferred embodiments and utilities of the present invention and are not meant to limit the present invention unless otherwise stated in the claims appended hereto.

EXAMPLES

Example 1

Preparation of 2-[(2-amino-2-methylpropyl) -amino ]-2-methyl-1-propanol 2-amino-2-methyl-1-propanol (AMP, 362.2 grams; 4.0 moles) was added to a 2-liter resin flask with a four neck top, equipped with a magnetic stirrer, a thermocouple, an additional funnel and a stopper at room temperature under nitrogen atmosphere. The AMP was heated to 40° C. and then solid 95% paraformaldehyde (HCHO, 127.5 grams, 4.0 moles) was added batch-wise in about five minutes. The reaction temperature rose slowly to 45° to 50° C. due to the exotherm. The resultant slurry gradually became a clear solution in about 30 minutes at this temperature. This clear solution was allowed to stir for an additional hour to complete the oxazolidine formation. 2-Nitropropane (2-NP, 337.0 grams, 3.6 moles) was added through the addition funnel to the warm oxazolidine solution dropwise over the course of about one hour in such a manner that the pot temperature was between 45° to 50° C. The resulting light yellow solution was allowed to stir for another hour at 45° to 50° C. The reaction mixture was gradually cooled to room temperature. However, in order to prevent solidification of nitro amino alcohol (NAA), 400 ml of methanol was added when the solution temperature was 30° to 35° C. The resultant solution (NAA/MeOH, 1137.6 grams) was used for hydrogenation without further purification.

A 2-liter autoclave charged with Raney nickel (A-7000, 20 grams) in 300 ml methanol was pressurized with 600 psi hydrogen and agitated at 600 rpm. The autoclave was heated to 50° C. Part of the aforementioned nitro amino alcohol (NAA, 557.4 grams) was then incrementally fed to this autoclave through a mechanical pump over a period of two hours. During the addition, the reaction temperature was maintained at 50° C. through a Parr controller. After the addition, the reaction temperature was kept under the same condition (600 psi, 600 rpm and 50° C.) for an additional hour. The resultant amino aminoalcohol/methanol solution was cooled to room temperature and filtered through a glass fiber filtering paper to remove the Raney nickel catalyst. The methanol/water filtrate of the desired amino aminoalcohol was stripped of methanol/water under ambient pressure, followed by vacuum stripping of other low boiling impurities. A viscous light yellow liquid product was obtained. This crude material was used for the oxazolidine formation without further purification.

Example 2

Preparation of α,α-4,4-tetramethyl-2-(methylethyl) -N-(2-methylpropylidene)-3-oxazolidine ethanamine (RD-4)

The crude amino aminoalcohol (131 grams, about 90%, 0.74 mole)obtained from Example 1 was transferred to a one liter, four necked round bottom flask, equipped with a mechanical stirrer, a thermocouple, a Dean-Stark trap (20 ml capacity) with a Friedrich condenser on top, and an addition funnel under nitrogen atmosphere. The viscous liquid was heated to 40° C. and isobutyraldehyde (IBA, 152 grams, 98%, 2.06 moles) was added to this liquid over a period of thirty minutes. During this addition, the reaction temperature rose to 65° C. The resultant yellow solution was heated to reflux to remove water azeotropically. A total of 27.2 grams water was removed after about twelve hours of heating. The resultant yellow liquid was then vacuum stripped to remove excess IBA and low boilers. Further vacuum distillation (148° to 158° C., at 30 to 35 mm Hg) gave a light yellow liquid product.

We claim:

1. A method of an acrylic polyoloid scavenging moisture from a polyisocganate-containing preparation, wherein the method comprises admixing with the preparation from 1 to about 100 moles of a moisture scavenging compound for every mole of water to be dehydrated from the preparation, the moisture scavenging compound having the structure:

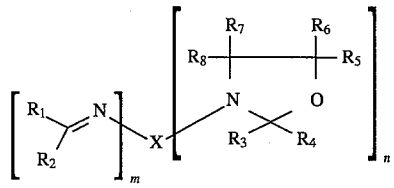

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

2. The method of claim 1 including from 1 mole to about 10 moles of said moisture scavenging compound for every mole of water to be dehydrated in the preparation.

3. The method of claim 1 including from 1 mole to about 3 moles of said moisture scavenging compound for every mole of water to be dehydrated in the preparation.

4. A method of an acrylic polyol and modifying rheology of a polyisocyanate-containing preparation, comprising admixing with the preparation an effective amount of a rheology modifying compound having the structure:

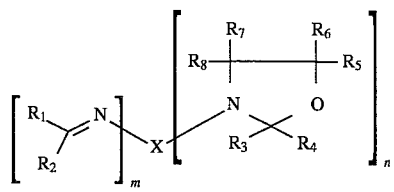

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

5. The method of claim 4 wherein the effective amount of the compound is from 1 to about 50 wt. % of the compound based on the total weight of the preparation.

6. The method of claim 4 wherein the effective amount of the compound is from 1 to about 30 wt. % of the compound based on the total weight of the preparation.

7. The method of claim 4 wherein the effective amount of the compound is from 1 to about 10 wt. % of the compound based on the total weight of the preparation.

* * * * *